United States Patent [19]

McLean

[11] 4,062,457

[45] Dec. 13, 1977

[54] LOADING DEVICE

[76] Inventor: James Duncan McLean, P.O. Box 321, Oxbow, Canada

[21] Appl. No.: 712,426

[22] Filed: Aug. 6, 1976

[30] Foreign Application Priority Data

Aug. 6, 1975 Canada .................................. 232957

[51] Int. Cl.² ............................ B60P 3/00; B60P 1/16
[52] U.S. Cl. ................................. 214/1 HH; 214/505
[58] Field of Search ................. 214/78, 501, 505, 506, 214/350, 352, 353, 131 R, 778, 779, 780, DIG. 4, 131 A, 1 HH

[56] References Cited

U.S. PATENT DOCUMENTS

| 3,896,956 | 7/1975 | Hostetler | 214/501 |
| 3,941,265 | 3/1976 | Nunnaly | 214/505 |

Primary Examiner—Robert G. Sheridan
Attorney, Agent, or Firm—Wheeler, Morsell, House & Fuller

[57] ABSTRACT

This invention relates to a loading device suitable for lifting bales onto a tiltable loading platform of a vehicle. The device employs a framework such as a plurality of longitudinal and transverse members which are secured to a loading platform. The transverse members extend rearwardly of the platform so that when it is tilted, the rearmost end of the transverse members are proximate the ground. These ends are in turn pivotally connected to a plurality of forks. The obtuse angle between the longitudinal members and the forks is adjustably limited so that the forks lie in a substantially horizontal plane when the loading platform is tilted. Bales are loaded onto the platform after the forks have been placed under the bales and the tilted platform returned to its normal horizontal position.

2 Claims, 4 Drawing Figures

LOADING DEVICE

FIELD OF THE INVENTION

This invention relates to a novel loading device suitable for lifting bales onto a tiltable loading platform of a vehicle.

BACKGROUND OF THE INVENTION

When harvesting hay, it is not uncommon to row cut hay into cylindrical bales which bales may have a diameter of up to twenty feet and a weight approximating three thousand pounds. Bales of this size pose serious problems to farmers as elaborate equipment and considerable effort is normally required in order to lift and transport the bales from the fields for storage.

SUMMARY OF THE INVENTION

The novel loading device of my invention is simple in construction, relatively inexpensive to manufacture, and fully adjustable so that it can be mounted on a variety of different types of farm vehicles having tiltable loading platforms. Moreover, my novel loading device can be mounted and removed on and off to the loading platform so that the vehicle's overall utility is not restricted to that of a bale-loader. Indeed, the device is versatile enough that it may be mounted on different types of loading platforms without the necessity of employing special mounting equipment or components.

The novel loading device according to my invention comprises a framework section which is adapted to be mounted on and secured to a tiltable loading platform. A plurality of parallel forks are pivotally connected to the one end of the framework which extends rearwards of the rear end of the platform. Adjustable limit means are provided between the framework and the forks pivotally connected thereto, so that the maximum degree of pivot of the forks relative to the framework can be selected. This limit means is necessary in order to enable the forks to lie in a substantially horizontal plan adjacent the ground when the loading platform is itself at its maximum angle of tilt. Since not all loading platforms have the same maximum angle of tilt, by adjusting the limit means, the angular position of the forks relative to the tilted loading platform and associated framework can be set so that the forks lie substantially horizontal on the ground.

In order to facilitate mounting of the loading device on a loading platform, particularly platforms having different angles of tilt, the means for mounting the framework to the platform can also be made adjustable. This is achieved by employing a framework constructed from at least two longitudinal parallel members which at their ends remote from the fork ends are rigidly connected together by a first transverse member. Intermediate the two ends of the longitudinal members, they are further supported in spaced relationship by a second transverse member which is in sliding engagement therewith.

Where the loading device comprises a rigid framework, that is to say the parallel longitudinal members are rigidly connected to the first and second transverse members, mounting of the device is achieved by first tilting the loading platform and then connecting the framework to that platform using suitable mounting means such as bolts. The ends of the parallel members overhanging the rear end of the platform are positioned close to the ground so that the forks pivotally connected thereto lie on the ground or preferably slightly inclined towards the ground in the rearward direction so that their extremities or fork ends touch the ground.

In applications where the means for mounting the framework is to be made adjustable, particularly where the device is to be mounted to different platforms having varying angles of tilt or where the distance between the rearmost end of the tilted platform and the ground may be different, second transverse member is first connected to the rear portion of the loading platform while the platform is in its normal (untilted) position. The platform is then tilted and the longitudinal members which are slidingly engaged by the second transverse member moved inward or outward relative thereto so that when the platform is at maximum tilt; the extension of the framework aft of the platform is adjusted so that the forks lie on the ground or have a slight downward angle in the direction towards the fork ends. The forward first transverse member is then bolted or otherwise secured to the platform and the device is then ready for use. Once different platforms have been drilled for mounting bolts, the device can be quickly and readily transferred from platform to platform merely by connecting the transverse members to the platforms at their pre-determined positions.

BRIEF DESCRIPTION OF THE DRAWINGS

Exemplary embodiments of the invention will now be described in connection with the accompanying drawings wherein.

DETAILED DESCRIPTION OF THE DRAWINGS

Figure 1:
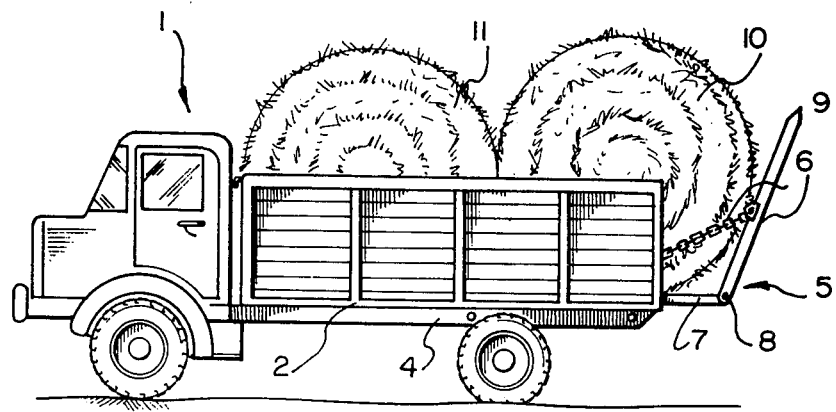
FIG. 1 is a side view of a typical vehicle having a loading platform to which my novel loading device is attached.
Figure 2:
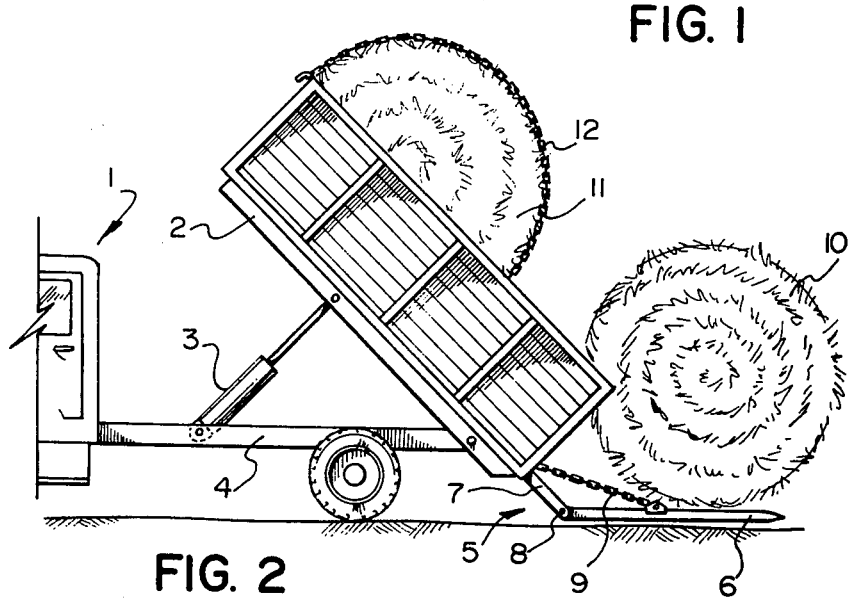
FIG. 2 is a similar side view of that illustrated in FIG. 1 showing the loading platform and loading device in tilted position.

Referring to FIGS. 1 and 2, truck 1, such as a grain truck, is illustrated, which includes a tiltable box or loading platform 2. Tilting of platform 2 is achieved by means of a conventional two-way hydraulic cylinder 3 which is connected to the vehicle chasis 4 and loading platform 2 and which functions in a known manner.

The novel loading device, generally designated by reference number 5, extends rearwardly of the end of the loading platform and includes a plurality of forks 6 which are pivotally connected to longitudinal members 7 forming part of the framework by means of pivot pins 8.

As discussed in greater detail hereinbelow, longitudinal members 7 are secured to loading platform 2 and the angle between members 7 and forks 6 is controlled by limit chain 9 so that the forks cannot be pivoted beyond a preselected obtuse angle. The vehicle illustrated in FIG. 2 is in the on-loading mode for bale 10; bale 11 having already been loaded and held in the forward portion of the loading platform by chains 12 so that it will not roll off. As illustrated, platform 2 is tilted so that forks 6 lie adjacent and substantially horizontal to the ground. The vehicle is then backed up so that forks underlie bale 10. As the tilted platform is levelled through the action of double-acting cylinder 3 bale 10 is raised by forks 6 which cannot pivot further due to limit chains 9 and as the platform 2 approaches the horizontal position, bale 10 rolls forwardly onto it. When in its tranporting mode, as seen in FIG. 1, forks 6 serve as a gate to stop loaded bales 10 and 11 from rolling off.

Unloading of bales 10 and 11 is achieved merely by tilting loading platform 2 so that the bales roll off.

Figure 3:
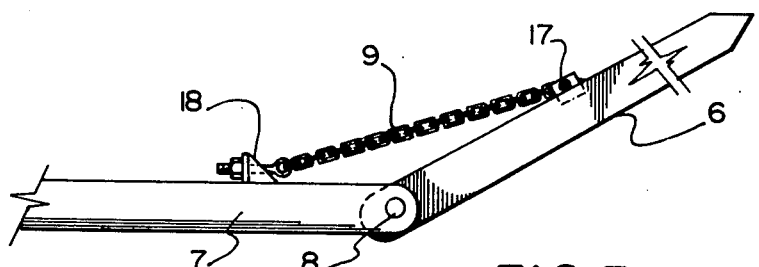
FIG. 3 is a detailed fragmentary view of the pivotal connection of a fork to a longitudinal frame member, together with a chain connector therebetween.
Figure 4:
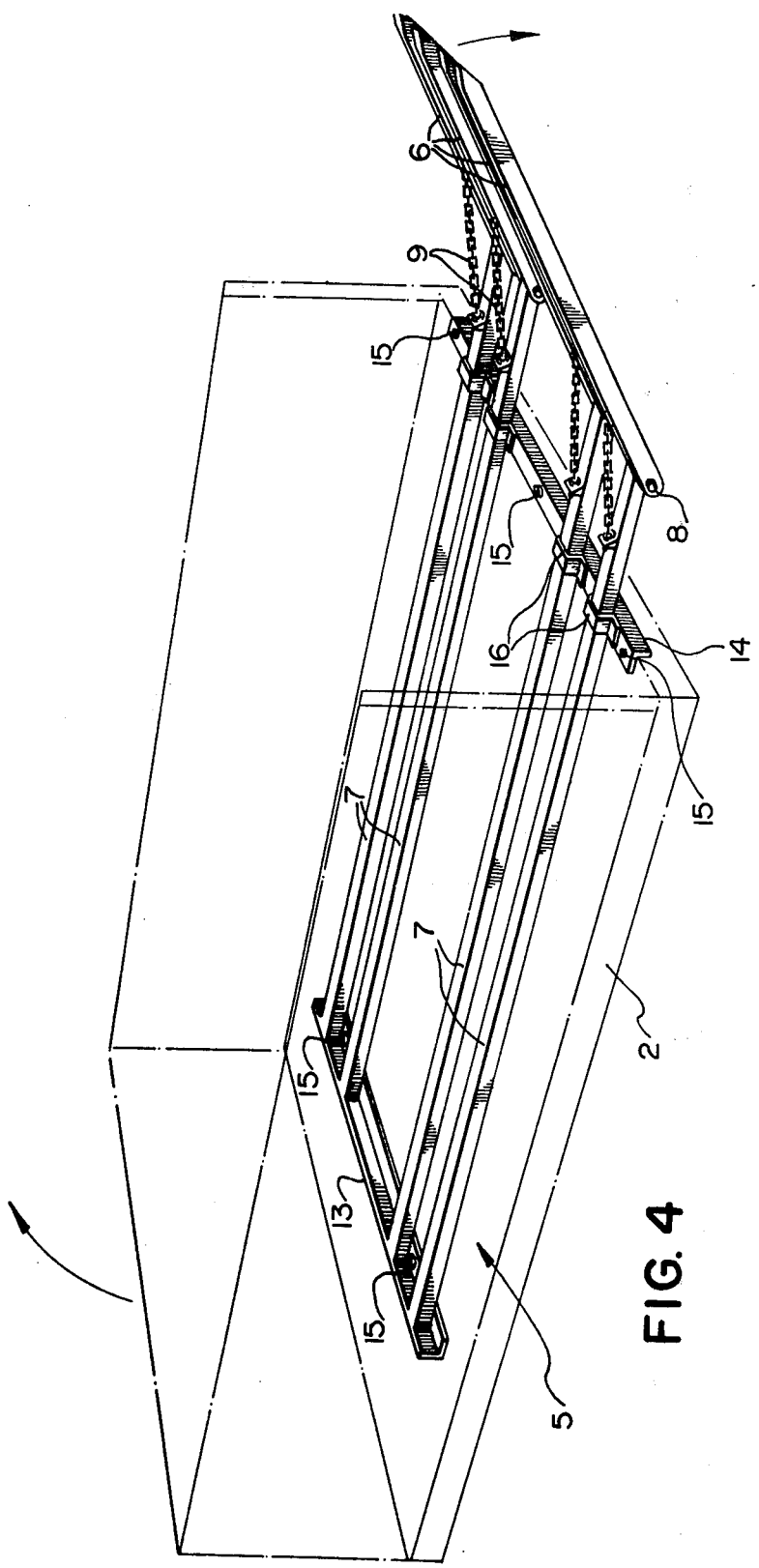
FIG. 4 is a schematic view of the loading device mounted on a loading platform.

With reference to FIGS. 3 and 4, in the loading device 5 as illustrated, the framework comprises four metallic box-section longitudinal members 7 and a forward or first transverse member 13 and a rear or second transverse member 14; members 13 and 14 being constructed of angle-iron. Transverse member 14 is secured to the rear end of the loading platform 2 (illustrated in broken lines) by suitable means such as bolts 15 whilst member 13 is likewise so secured. While the ends of longitudinal members 7 are rigidly secured to transverse member 13 at their forward ends by welding, these members are slidingly engaged by transverse member 14 which has straps 16 welded thereto to permit reciprocation of members 7. This permits longitudinal members 7 to be moved forwardly or rearwardly relative to the platform 2 when first mounting the device so that the longitudinal members will extend rearwardly of the platform, the optimum length when the platform is tilted.

As best seen in FIG. 3, the obtuse angle between, forks 6 and members 7 which are pivotally connected to forks 6 by anchor lugs 17 and to members 7 by eyebolts 18. Eyebolts 18 can be connected to selected links of the chains 9 in a known manner so that the desired angle as above described can be controlled and set. What I claim as my invention is:

1. In a vehicle having a tiltable platform, a loading device for lifting bales onto said tiltable platform, said device comprising a framework having at least two opposed and parallel longitudinally extending longitudinally slidable members and at least two parallel transverse members which are normal to said longitudinal members, at least one of said transverse members being rigidly connected to said longitudinal members adjacent one of their ends; a plurality of straight parallel forks pivotally connected directly to said longitudinal members at their other ends, the first of said transverse members being rigidly connected to said longitudinal members at their ends remote from said forks, and wherein the second of said transverse members is in sliding engagement with said longitudinal members, and adjustable limit means for maintaining an adjustably fixed degree of pivot between the framework and the forks at a preselected obtuse angle.

2. In a vehicle having a tiltable platform, a loading device for lifting bales onto said tiltable platform, said device comprising a framework having at least two opposed and parallel longitudinal members and at least two opposed and parallel transverse members which are normal to said longitudinal members, at least one of said transverse members being rigidly connected to said longitudinal members adjacent one of their ends, a plurality of parallel forks pivotally connected to said longitudinal members at their other ends, and adjustable limit means for maintaining the degree of pivot between the framework and the forks at a preselected obtuse angle, said adjustable limit means comprising at least two chains and means for connecting said chains to said framework and said forks at predetermined lengths of the chains.

* * * * *